United States Patent
Forge et al.

(10) Patent No.: US 10,242,495 B2
(45) Date of Patent: Mar. 26, 2019

(54) METHOD FOR ADAPTING A MESH MODEL OF A GEOLOGICAL SUBSURFACE

(71) Applicant: TOTAL SA, Courbevoie (FR)

(72) Inventors: Aurèle Forge, Pau (FR); Frédérik Pivot, Pau (FR)

(73) Assignee: TOTAL SA, Courbevoie (FR)

( * ) Notice: Subject to any disclaimer, the term of this patent is extended or adjusted under 35 U.S.C. 154(b) by 236 days.

(21) Appl. No.: 14/909,384

(22) PCT Filed: Jul. 21, 2014

(86) PCT No.: PCT/FR2014/051860
§ 371 (c)(1),
(2) Date: Feb. 1, 2016

(87) PCT Pub. No.: WO2015/015086
PCT Pub. Date: Feb. 5, 2015

(65) Prior Publication Data
US 2016/0180582 A1    Jun. 23, 2016

(30) Foreign Application Priority Data
Jul. 31, 2013  (FR) .................................. 13 57564

(51) Int. Cl.
*G06T 17/05* (2011.01)
*G06T 17/20* (2006.01)
(Continued)

(52) U.S. Cl.
CPC ............ *G06T 17/05* (2013.01); *G01V 99/005* (2013.01); *G06K 9/6206* (2013.01); *G06T 17/20* (2013.01); *G06T 19/20* (2013.01)

(58) Field of Classification Search
None
See application file for complete search history.

(56) References Cited

U.S. PATENT DOCUMENTS

| | | | | | |
|---|---|---|---|---|---|
| 4,821,164 | A | * | 4/1989 | Swanson ................ | G01V 1/282 2/919 |
| 5,844,564 | A | * | 12/1998 | Bennis ................... | G06T 17/20 345/423 |

(Continued)

FOREIGN PATENT DOCUMENTS

| EP | 0 254 325 B2 | 3/1999 |
|---|---|---|
| EP | 0 801 364 B1 | 7/2003 |
| WO | WO 03/050766 A2 | 6/2003 |

OTHER PUBLICATIONS

Schlumberger, "Petrel Workflow Tools—4 Day Introduction Course", 2004, pp. 1-23.*

(Continued)

*Primary Examiner* — Zhengxi Liu
(74) *Attorney, Agent, or Firm* — Patterson Thuente Pedersen, P.A.

(57) ABSTRACT

The present invention concerns a method for adapting a mesh model to make it match a target. The model comprises a plurality of reference interfaces, each reference interface being associated with a target interface in the target. The method comprises, for at least one pair of successive interfaces, defining four intersections between a current alignment and the reference interfaces or the associated target interfaces, and modifying the coordinates for each current corner of the alignment on the basis of the initial coordinates of the current corner, and the four defined intersections, the modified coordinates of the current corner being on the current alignment.

13 Claims, 8 Drawing Sheets

(51) Int. Cl.
  *G06T 19/20* (2011.01)
  *G06K 9/62* (2006.01)
  *G01V 99/00* (2009.01)

(56) References Cited

U.S. PATENT DOCUMENTS

| | | | | |
|---|---|---|---|---|
| 7,574,331 | B2* | 8/2009 | Potze | G01B 11/24 345/420 |
| 8,965,745 | B2* | 2/2015 | Lepage | G01V 99/005 703/10 |
| 2003/0132934 | A1* | 7/2003 | Fremming | G01V 1/30 345/419 |
| 2004/0220789 | A1* | 11/2004 | Thore | G01V 11/00 703/10 |
| 2004/0246249 | A1* | 12/2004 | Deny | G01V 1/282 345/419 |
| 2006/0209634 | A1* | 9/2006 | Vigen | G01V 1/3835 367/21 |
| 2007/0073527 | A1* | 3/2007 | Flandrin | G06T 17/20 703/10 |
| 2007/0219724 | A1* | 9/2007 | Li | G01V 1/282 702/12 |
| 2010/0225647 | A1* | 9/2010 | Flew | G06T 17/20 345/420 |
| 2011/0310101 | A1* | 12/2011 | Prange | G01V 99/00 345/420 |
| 2012/0022837 | A1* | 1/2012 | Asbury | G06T 17/05 703/2 |

OTHER PUBLICATIONS

International Search Report with English translation for PCT/FR2014/051860, dated Mar. 6, 2015, 12 pages.
Adam Faeth and Chris Harding; Supporting Interactive Haptic Shaping of 3D Geologic Surfaces with Deformation Property Painting, 2009, xp055119633, Retrieved from the Internet: URL:http://www.vrac.iastate.edu/charding/M4/papers/eg09_deformation_mapping_under_rev.pdf,[retrieved on May 22, 2014] abstract.

* cited by examiner

METHOD FOR ADAPTING A MESH MODEL OF A GEOLOGICAL SUBSURFACE

RELATED APPLICATIONS

The present application is a National Phase entry of PCT Application No. PCT/FR2014/051860, filed Jul. 21, 2014, which claims priority from FR Patent Application No. 13 57564, filed Jul. 31, 2013, said applications being hereby incorporated by reference herein in their entirety.

FIELD OF THE INVENTION

The present invention relates to the field of adapting representations of geological subsurfaces to match a target representation and to assist with reliable determination of geological subsurfaces.

BACKGROUND OF THE INVENTION

For proper determination of gas or hydrocarbon reserves in a reservoir, it is useful to establish grids (or a mesh model) of the reservoirs, for example on the basis of 3D seismic interpretation of the subsurface.

The reservoir grids contain mesh layers. These layers often tend to be representative of the sedimentation layers present in the subsurface.

Thus, the mesh layers of the model attempt to follow the stratigraphic layers determined by various tools (seismic tools, modeling based on well data, etc.). In addition, a mesh may be constrained by a number of topological and/or geometrical conditions.

It is possible that the various tools available to geologists or well engineers do not provide the same results, or that topological and/or geometric conditions (for example well data) do not exactly match the results provided by these tools. In addition, these tools can provide results containing uncertainties (interpretation of a noisy seismic image for example). Alternative solutions can then exist.

When modifying to an alternative solution, it is often necessary to completely recalculate a new mesh model to adapt to this modification.

This recalculation can be long, tedious, and inefficient, especially if the differences between the initial solution and the new solution are small.

There is therefore a need to simplify the calculation of a new model in the case of modifying a solution to an alternative solution. The present invention improves the situation.

The present invention proposes deforming the grid of the initial model in order to allow adapting the initial model to the new alternative solution without recalculating the entire model.

The invention therefore provides a method for deforming a mesh model, said model comprising a plurality of reference interfaces comprising a sequence, each reference interface being associated with a target interface in said model.

The method comprises:
for at least one pair of successive interfaces in the sequence of the plurality of interfaces formed by a first reference interface and a second reference interface, the model comprising a plurality of alignments of mesh cell corners between said first interface and said second interface, these alignments forming mesh cell edges, each corner having initial coordinates in the model and for each current alignment among said plurality of cell corners:

determining a first intersection between the current alignment and said first reference interface;
determining a second intersection between the current alignment and said second reference interface;
determining a third intersection between the current alignment and the target interface associated with said first reference interface;
determining a fourth intersection between the current alignment and the target interface associated with said second reference interface;
modifying the coordinates for each current corner of the alignment as a function of the initial coordinates of said current corner, of the first intersection, second intersection, third intersection, and fourth intersection, the modified coordinates of said current corner being on the current alignment.

The reference interfaces are surfaces (in the case of a 3D mesh) or lines (in the case of a 2D mesh) virtually separating two mesh layers. In most cases these interfaces are substantially horizontal when the sedimentary layers have not been modified. It is thus possible to say that the interfaces are defined by the upper and lower faces (3D mesh) or edges (2D mesh) of the cells of the layer: an upper reference interface and a lower reference interface are thus defined for each of the mesh layers.

It is possible to classify the different target interfaces or reference interfaces according to their position in the model (the interfaces do not intersect). For example, the upper interface of a mesh layer can have a lower sequence index than the lower interface of that layer: as the reference interfaces are a subset of the interfaces of the model, the sequence is still respected.

Of course, between two reference interfaces, a plurality of mesh layers may exist between two successive reference interfaces.

In a direction substantially perpendicular to the reference interface, mesh cell edges define a mesh corner alignment.

Most often, the intersection between a current alignment and a reference interface is an upper corner of a cell whose upper face (in the case of a 3D mesh) or upper edge (in the case of a 2D mesh) is part of this reference interface.

The modification of the coordinates of the corners keeps these corners on the alignment. While it may seem appropriate to simply move those corners along a vertical axis independently of the local characteristics of the mesh, such a simple displacement is not always appropriate. It can degrade the quality of the mesh and "break" the pillars of the mesh (sever the alignment of the edges or corners). This feature allows maintaining the ideal conditions of the model for subsequent simulations.

The method may further comprise the receiving of said mesh model.

The method may further comprise the providing of the modified mesh model containing the modified corners.

In addition, a current coordinate system may be defined along the current alignment, the first intersection having a coordinate $c_1$ in the current coordinate system, the second intersection having a coordinate $c_2$ in the current coordinate system, the third intersection having a coordinate $c_3$ in the current coordinate system, the fourth intersection having a coordinate $c_4$ in the current coordinate system, said current corner having an initial coordinate $c_c$ in the current coordinate system.

The modified coordinate of said current corner in the current coordinate system can then be a function of:

$$C_n = C_C + (C_2 - C_4) + (C_1 - C_3 - C_2 + C_4)\frac{C_c - C_2}{C_1 - C_2}.$$

Thus, the modification of a current point of the alignment can incorporate in a linear manner the displacement of the different interfaces (from reference to target).

In one possible embodiment, the method may further comprise, for at least one pair of successive interfaces, the corners of said alignments comprised between said first interface and said second interface having a sequence number in each alignment:
- for each current sequence number, identification of an intermediate interface formed of cell sides, said sides having as corners the corners of said current sequence number;
- for each intermediate interface and for each current corner of said current interface, a second modification of the coordinates of said current corner as a function of the current coordinates of said current corner and as a function of the current coordinates of distant corners that lie within a bounding box around the current corner.

We are calling intermediate interfaces the interfaces, such as those described above, which are strictly comprised between the reference interfaces.

It is possible to classify the various intermediate interfaces according to their position in the model (interfaces not intersecting). For example, the upper intermediate interface of a mesh layer can have a sequence index that is lower than the lower intermediate interface of that layer.

The second modification of the coordinates of cells can allow preventing the appearance of singularities.

The distance between the current corner and the other corners can be any distance in the mathematical sense.

In addition, as the coordinates of the corners are expressed by a plurality of components, the second modification of the coordinates of said corner may comprise calculating a median filter or an average of the coordinates of said current corner along at least one component and of the coordinates of said distant corners along the at least one component.

The at least one component may be, for example, the coordinate along axis $\vec{z}$.

In addition, said current corner being comprised in an alignment, the second modification of the coordinates of said current corner can maintain said corner in said alignment.

Thus, if the calculation of a median filter or an average is only done on the value of a component (for example coordinates along axis $\vec{z}$), it is possible for the modification to impact the other coordinates by displacing said corner along the pillar (or alignment) until the displacement along the component (for example along axis $\vec{z}$) corresponds to the calculation.

The bounding box may also be a function of a distance from said current corner to a fault in said model.

It is thus possible to limit the impact of the second modification when the point concerned is located at a large distance from faults, meaning far from probable causes of the appearance of a singularity.

In addition, the bounding box may be a function of an anisotropic direction in said model.

In one embodiment, the anisotropic direction may be parallel to a line passing through said current corner and perpendicular to a fault in said model.

It is thus possible to reduce the number of points presenting singularities (and statistically located on faults) in the calculation of the second modification.

In addition, as the corner coordinates are expressed by a plurality of components, the distance between a current corner and a modified current corner, along at least one coordinate component, may be less than a threshold value.

It is thus possible to limit the second modification of the corners along a coordinate component (for example along the vertical axis $\vec{z}$). Beyond the threshold value, the modification may, for example, be limited to this threshold value along this component (for example using the min operator).

The method may further comprise, the model comprising at least one fault:
- identifying at least one corner having a distance to the at least one fault that is less than a predetermined influence distance;
- modifying the coordinates of the corner having a distance to the at least one fault that is less than the predetermined influence distance, as a function of modifications determined for a plurality of points having a distance to the at least one fault that is greater than the predetermined influence distance and part of a common interface with the corner having a distance to the at least one fault that is less than the predetermined influence distance.

In one embodiment, the modification of the coordinates of the corner having a distance to the at least one fault that is less than the predetermined influence distance may comprise a calculation of a weighted average.

The weighted average may take into account the modifications calculated for points outside the area of influence of the fault, in other words beyond the predetermined influence distance. The weighting factor may be a function of the distance of the point concerned to the fault for example.

In addition, the modification of the coordinates of the corner having a distance to the at least one fault that is less than the predetermined influence distance may include a regression.

The regression (for example linear or polynomial) may take into account the modifications calculated for points outside the fault area of influence, in other words beyond the predetermined influence distance.

A device for deforming a mesh may be advantageous in itself, as it simplifies the work of geologists or well engineers.

The invention therefore also relates to a device for deforming a mesh model comprising a plurality of reference interfaces, the plurality of reference interfaces comprising a sequence and each reference interface being associated with a target interface in said model.

The device comprises:
- optionally, an input interface for receiving the mesh model;
- circuitry suitable for carrying out the following actions for at least one pair of successive interfaces in the sequence of the plurality of interfaces, formed by a first reference interface and a second interface reference, the model comprising between said first interface and said second interface a plurality of mesh corner alignments, these alignments forming mesh cell edges, each corner having initial coordinates in the model and for each current alignment among said plurality of mesh corners:
  - determining a first intersection between the current alignment and said first reference interface;

determining a second intersection between the current alignment and said second reference interface;

determining a third intersection between the current alignment and the target interface associated with said first reference interface;

determining a fourth intersection between the current alignment and the target interface associated with said second reference interface;

modifying the coordinates for each current corner of the alignment, as a function of the initial coordinates of said current corner, the first intersection, second intersection, third intersection, and fourth intersection, the modified coordinates of said current corner being on the current alignment;

optionally, an output interface for providing the modified mesh model.

The invention also relates to a computer program comprising instructions for implementing the method described above, when that program is executed by a processor.

This program may use any programming language (for example, an object language or some other language), and be in the form of an executable source code, partially compiled code, or fully compiled code.

FIG. 6, described in detail below, can be the flowchart of the general algorithm of such a computer program.

BRIEF DESCRIPTION OF THE DRAWINGS

Other features and advantages of the invention will be apparent from reading the description that follows. This description is purely illustrative and should be read with reference to the accompanying drawings in which.

DETAILED DESCRIPTION OF THE DRAWINGS

Figure 1:
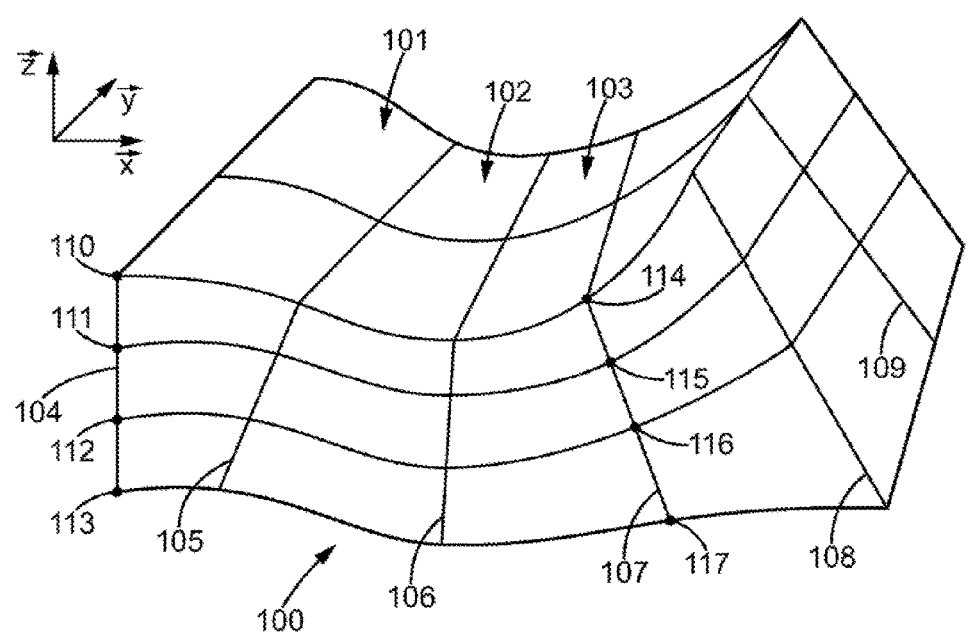
FIG. 1 illustrates a particular embodiment of the mesh of a three-dimensional model.

FIG. 1 illustrates one particular embodiment of the mesh of a three-dimensional model.

This model 100 consists of a plurality of cells (101, 102, 103, etc.). In addition, these cells comprise corners (110, 111, 112, 113, 114, 115, 116, 117, etc.). Most often, these corners are shared by multiple cells (for example 4 cells).

This type of mesh does not require regular cells but can be adapted to the geometric shapes and constraints of the subsurface represented.

Thus, in a stratigraphic mesh model, the cells are grouped into layers representing the layers of sedimentation present in the modeled subsurface.

In addition, the edges perpendicular to the layers (in other words the edges substantially in direction $\vec{z}$ in the example of FIG. 1) are aligned for a set of layers of the model (this set of layers is defined by the set of successive layers for which an alignment of corners is possible).

These alignments of edges (or corners) are called "pillars". As an illustration, segments 104 to 109 constitute pillars:

pillar 104 comprises an alignment of corners 110-113;

pillar 107 comprises an alignment of corners 114-117.

Figure 2A:
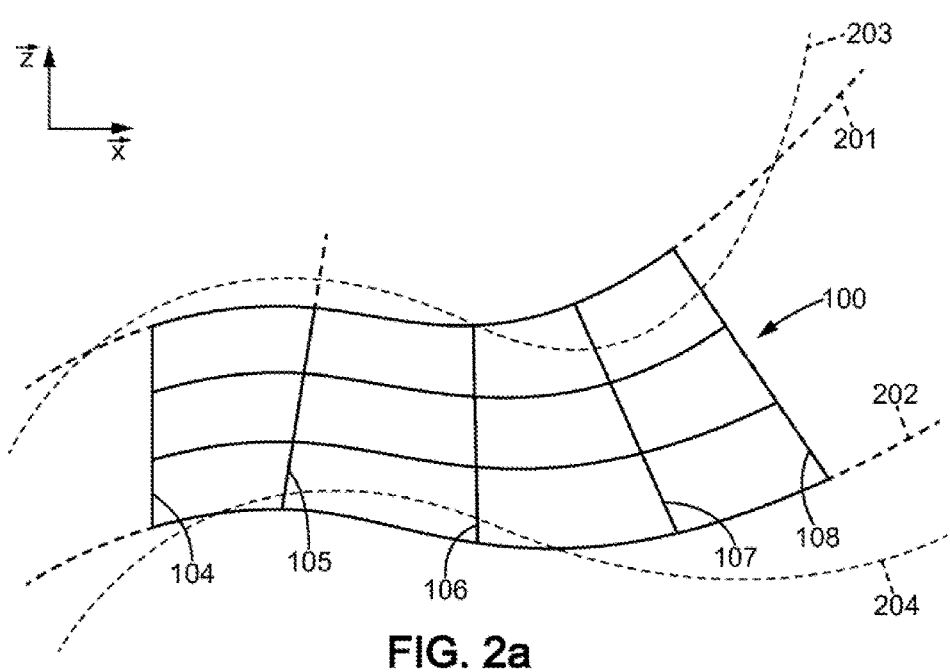
FIG. 2a illustrates an example of reference interfaces and target interfaces in a particular embodiment of the invention.

FIG. 2a illustrates an example of reference interfaces and target interfaces in one particular embodiment of the invention.

For simplification, FIG. 2a is shown in two dimensions, but the following description is also applicable to a three-dimensional mesh.

The mesh 100 comprises three layers of cells stacked upon one another. Each layer allows defining at least one interface, meaning the set of upper or lower faces (3D mesh) or edges (2D meshes) of the cells of said layer. A layer can have a discontinuity, particularly in the event of faults being present (see FIGS. 4, 5a, and 5b).

For example, it is possible to define an interface 201 comprising the upper faces (3D mesh) or edges (2D meshes) of the cells of the upper layer of the model or of a set of layers. In addition, it is possible to define an interface 202 comprising the lower faces (3D mesh) or edges (2D meshes) of the cells of the lower layer of the model or of a set of layers.

Interfaces 201 and 202 are also called reference interfaces.

For the reasons described above, geologists or well engineers may feel that these reference interfaces are not properly positioned spatially. They may also judge that the correct spatial position of these interfaces (201 and 202) should be at the target interfaces (203 and 204 respectively) represented in FIG. 2a.

Figure 2B:
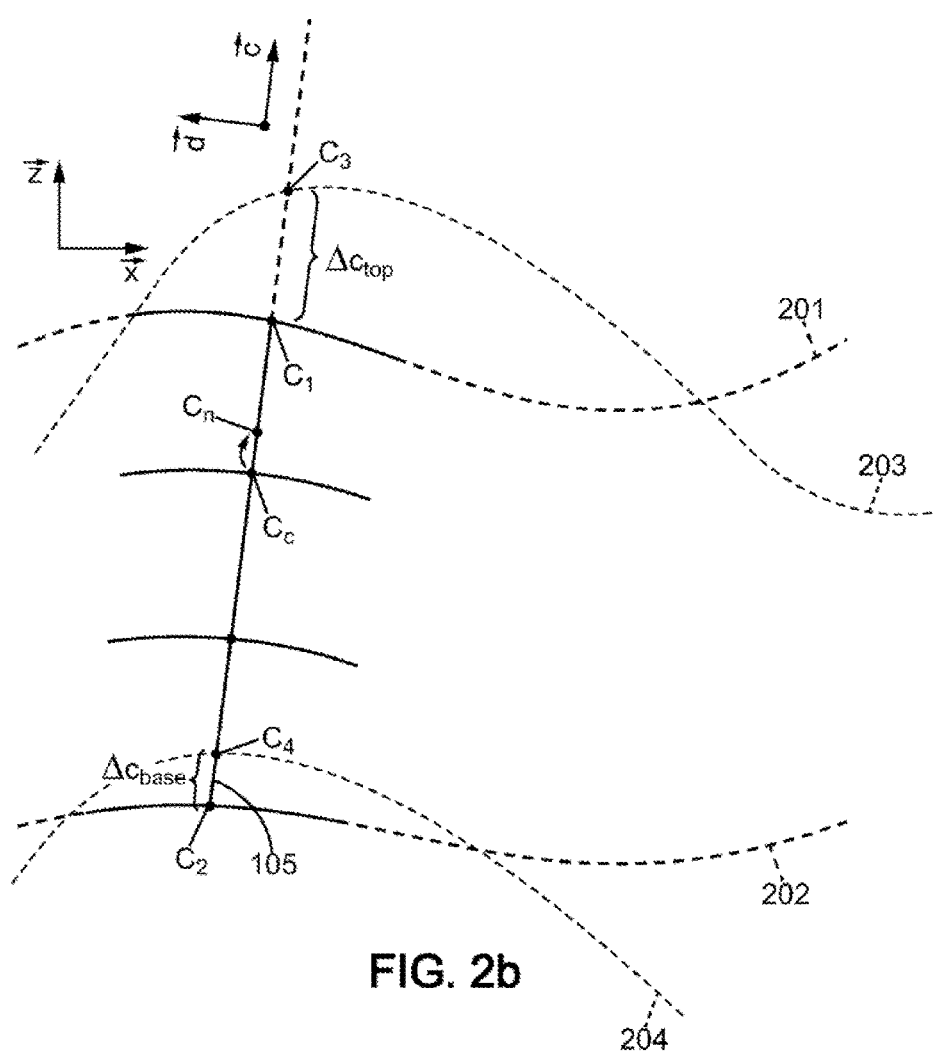
FIG. 2b illustrates an example of calculating a modification of the coordinates of a point comprised between two successive reference interfaces in a particular embodiment of the invention.

FIG. 2b shows a detailed view of FIG. 2a and illustrates an example calculation of a modification of the coordinates of a point comprised between two successive reference interfaces, in one particular embodiment of the invention.

The intersection of pillar 105 with interface 201 (respectively 202) is point $C_1$ (respectively $C_2$). If we hypothesize that the pillar is located on a fault of the model (see pillar 540, FIGS. 5a and 5b), the intersection of the pillar with a reference interface can reveal several points: for the implementation of the method, it may be sufficient to choose one of the points of intersection so revealed.

To modify the coordinates of a point in the mesh, it is also useful to determine the intersections of pillar 105 with the target interfaces 203 (point $C_3$) and 204 (point $C_4$). To calculate such intersections, it is possible to perform linear interpolation to determine the equation for the line passing through the various points/corners of the alignment 105.

In addition, many algorithms exist for determining an intersection between a straight line and a curve. For example, to determine the intersection of line 105 with curve 203, it is possible to use an algorithm comprising a method of "dual shooting" and dichotomic refining:

a/ From a first point on line 105 (for example point $C_1$), determining two secondary points located at a first given distance from the first point (for example, the distance along $\vec{z}$ between point $C_1$ and curve 203) and located on line 105 on each side of point $C_1$, two segments being created between the first point and each of the two secondary points;

b$_1$/ If one of the two segments contains an intersection with curve 203 (determined by comparing the sign of the difference between the coordinate along $\vec{z}$ of one end of the segment and the coordinate along $\vec{z}$ of the projection along $\vec{z}$ of this latter end onto curve 203, and the sign of the difference between the coordinate along $\vec{z}$ of the other end of the segment and the coordinate along $\vec{z}$ of the projection along $\vec{z}$ of this other end onto curve 203: if the sign is different, this means that there is an intersection between the line and the curve), then refining the position of the intersection by a dichotomic subdivision between the ends of the segment containing the intersection.

b$_2$/ If neither segment contains an intersection with curve 203, then determining, for each of the former secondary points, a new secondary point located at the second distance (for example equal to the first distance) from the former secondary point and being neither the first point nor a previously calculated secondary point, and repeating step b$_1$ and b$_2$ with the two segments formed by each of the former secondary points with the new determined secondary points.

The coordinates of points $C_3$ and $C_4$ can thus be determined.

For purposes of simplification, it is possible to transform the frame of reference $(\vec{x}, \vec{z})$ by rotation to a new frame of reference $(\vec{c}, \vec{d})$ with line 105 aligned with vector $\vec{c}$ of the latter frame of reference.

Thus, point $C_3$ corresponds to a translation of point $C_1$ of $\Delta c_{top}$ along axis $\vec{c}$. In addition, point $C_4$ corresponds to a translation of point $C_2$ of $\Delta c_{base}$ along axis $\vec{c}$. For each point of the alignment 105 between points $C_1$ and $C_2$, it is possible to determine a translation of these points using an "elastic" model. This "elastic" model models a deformation and dragging effect on the points of the cells comprised between interfaces 201 and 202 as a function of the displacement of these interfaces (expansion or contraction).

For example, it is possible to determine a translation of a point $C_c$ of the alignment according to the following formula:

$$C_n = C_C + (C_2 - C_4) + (C_1 - C_3 - C_2 + C_4)\frac{C_c - C_2}{C_1 - C_2}$$

or $$C_n - C_C = \Delta C_{base} + (\Delta C_{top} - \Delta C_{base})\frac{C_c - C_2}{C_1 - C_2}$$

$c_c$ being the coordinates along axis $\vec{c}$ of point $C_c$, $c_n$ being the coordinates along axis $\vec{c}$ of point $C_n$, $c_1$ being the coordinates along axis $\vec{c}$ of point $C_1$, $c_2$ being the coordinates along axis $\vec{c}$ of point $C_2$, $c_3$ being the coordinates along axis $\vec{c}$ of point $C_3$, $c_4$ being the coordinates along axis $\vec{c}$ of point $C_4$.

If, in the above formula, the translation of point $C_c$ is linear with regard to the displacements of points $C_1$ and $C_2$, it is also possible to make this translation non-linear.

Furthermore, it is possible to limit the translation of point $C_c$ by limiting the translation value to a maximum value $c_{max}$. Thus, $|c_n - c_c|$ can be equal to $$\min\left(\left|(C_2 - C_4) + (C_1 - C_3 - C_2 + C_4)\frac{C_c - C_2}{C_1 - C_2}\right|, |C_{max}|\right)$$

where min is the minimum operator. If this thresholding is applied to the translation along axis $\vec{c}$, it may also be applied along axis $\vec{z}$ with a maximum displacement of $z_{max}$ along this axis. Then the value of the translation $|c_n - c_c|$ of point $C_c$ can be equal to $$\min\left(\left|(C_2 - C_4) + (C_1 - C_3 - C_2 + C_4)\frac{C_c - C_2}{C_1 - C_2}\right|, \left|\frac{z_{max}}{\cos(\alpha)}\right|\right)$$

where $$\frac{\pi}{2} + \alpha$$

is the angle of rotation between frame of reference $(\vec{x}, \vec{z})$ and frame of reference $(\vec{c}, \vec{d})$.

Figure 3:
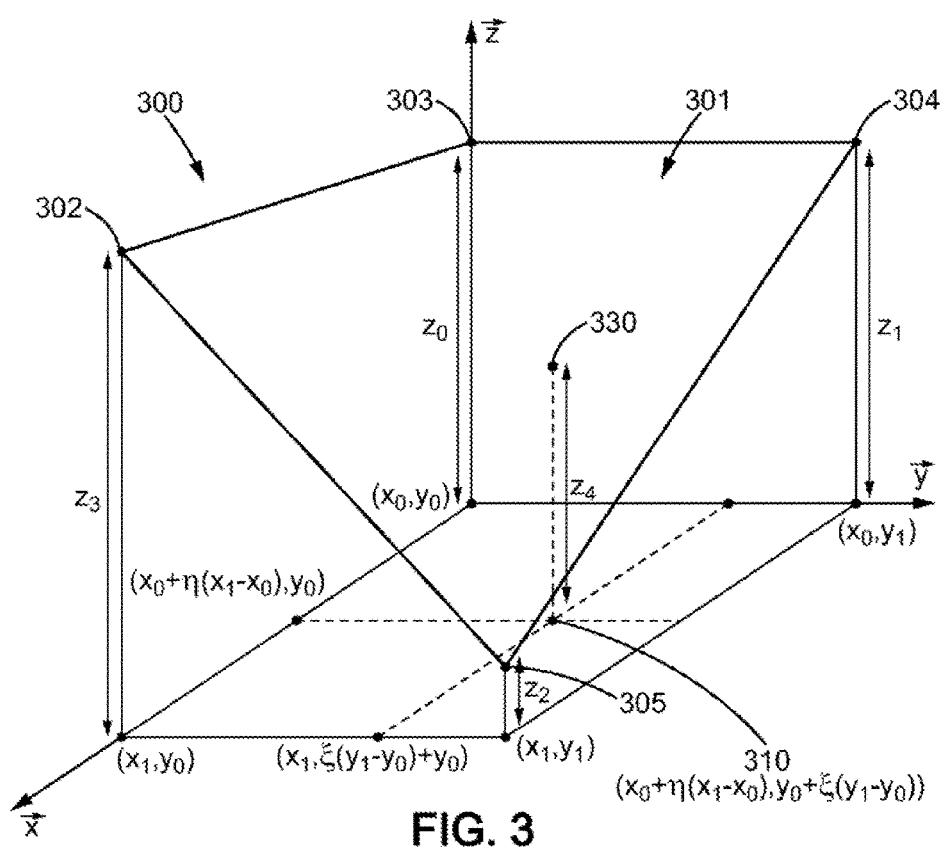
FIG. 3 illustrates an example of calculating the coordinates of a point on a face of a mesh cell.

FIG. 3 illustrates an example calculation of the coordinates of a point on a face of a cell.

When modifying the coordinates of the corners of such a cell as described above, it is possible to determine the z coordinate of points of a given interface at any point (x, y), even if only the points of the pillars are modified using the above algorithm. Let us suppose that the given interface comprises the face defined by:
- corner 302 (coordinates $(x_1, y_0, z_3)$);
- corner 303 (coordinates $(x_0, y_0, z_0)$);
- corner 304 (coordinates $(x_0, y_1, z_1)$);
- corner 302 (coordinates $(x_1, y_1, z_2)$).

One approach is to consider that coordinate $z_4$ of point 330 (located above, along axis $\vec{z}$, point 310 of coordinates $(x_0+\eta(x_1-x_0), y_0+\xi(y_1-y_0), 0)$ and located on the face of interest) can be approximated by the coordinate along $\vec{z}$ of the nearest corner among corners 302 to 305. The nearest corner is determined to be in plane $(\vec{x}, \vec{y})$, in other words:
- the nearest corner is corner 303 if $\eta<0.5$ and if $\xi<0.5$,
- the nearest corner is corner 304 if $\eta<0.5$ and if $\xi>0.5$,
- the nearest corner is corner 305 if $\eta>0.5$ and if $\xi>0.5$, and
- the nearest corner is corner 302 if $\eta>0.5$ and if $\xi<0.5$.

It is also possible to perform a Lagrange approximation to evaluate coordinate $z_4$ of point 330. This coordinate $z_4$ can be approximated by the value $z_0(\xi-1)+z_1(\xi-\xi\eta)+z_2(\eta-\xi\eta)+z_3\xi\eta$.

Figure 4:
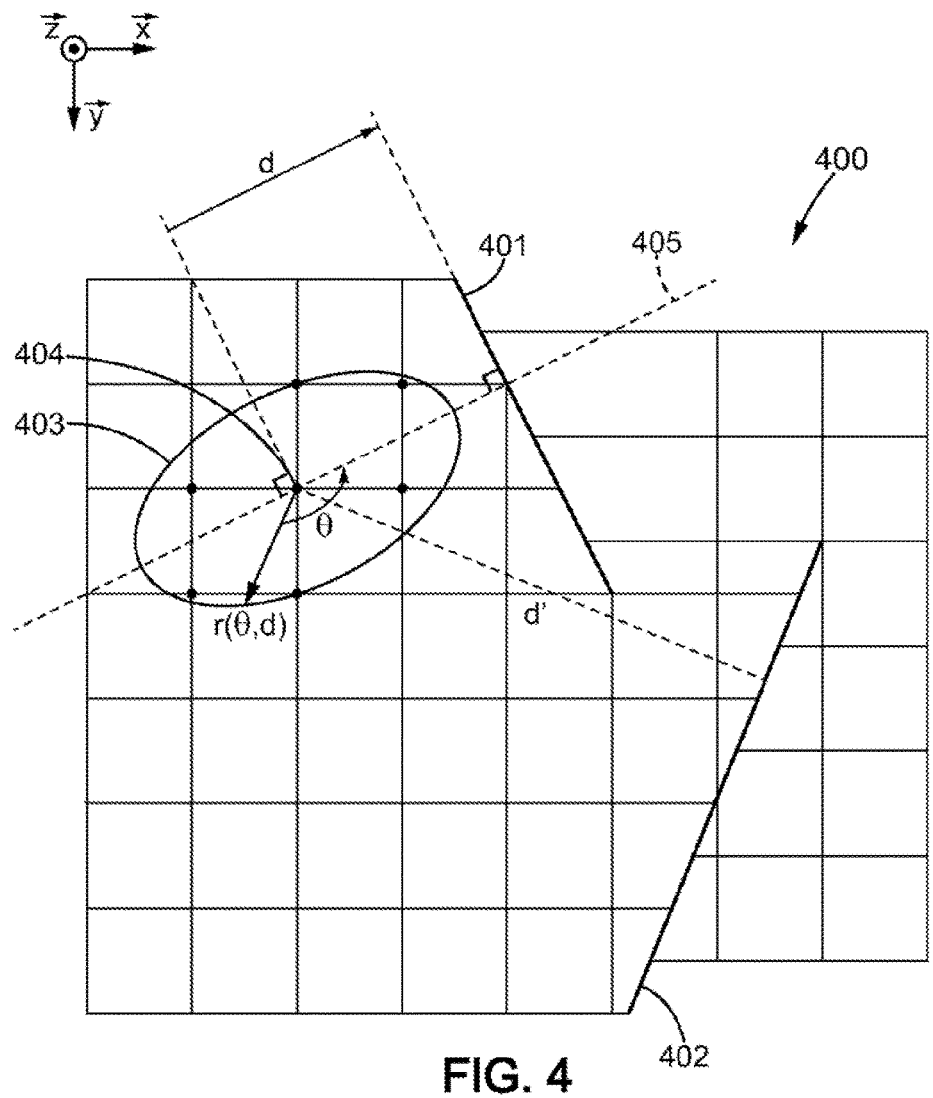
FIG. 4 illustrates an example modification of the coordinates of a cell corner as a function of the coordinates of nearby cells.

FIG. 4 illustrates an example modification of the coordinates of a corner of a cell as a function of the coordinates of nearby cells.

FIG. 4 represents a plurality of cells in the same layer, projected to a plane (the plane of the figure). To avoid certain edge effects (or singularities) generated by the presence of faults in the model 400, it is possible to "smooth" the values of cell coordinates in a spatial direction (for example, the direction of axis $\vec{z}$, axis representing the vertical in the subsurface model 400).

Thus, for each cell corner 404, it is possible to average or to calculate a median filter as a function of the coordinates of the corner concerned 404 along axis $\vec{z}$ and the coordinates of neighboring corners (in other words corners at a distance that is less than a certain distance from the corner concerned 404) along this same axis. The determination of neighboring corners may include calculating a distance r between two points: this distance can be a Euclidean distance, a Manhattan distance, a Minkowski distance, a Chebyshev distance, or any other distance in the mathematical sense.

Moreover, the distance r may be a function of the distance from the point concerned 404 to a fault (in other words d for the distance to fault 401, the distance then being a function r(d)). Indeed, it may be useful to reduce the number of corners considered to be neighbors when the distance to the fault is large, as the probability of the occurrence of a singularity statistically decreases.

The distance r can also be a function of an angle θ representative of an angle to the direction to the fault (the distance then being a function r(θ)). This direction is also called the anisotropic direction. Thus, it is possible to reduce the number of corners considered as neighbors in a direction parallel to the fault and to increase it in a direction perpendicular to the fault, as the probability of the occurrence of a singularity is statistically greater along faults.

As an illustration, the points neighboring point 404 are shown in the center of the ellipse 403 in FIG. 4 (the distance being r(θ, d)).

In case of a plurality of faults, it is possible, for calculating the new coordinate of point 404 along axis $\vec{z}$:
- to consider only the nearest fault in the calculation (in other words fault 401 being closer to corner 404 than fault 402, d'>d)
- or to consider all the faults of the model (401 and 402) and to form a union of the corners identified as neighbors for each of the faults.

Figure 5A:
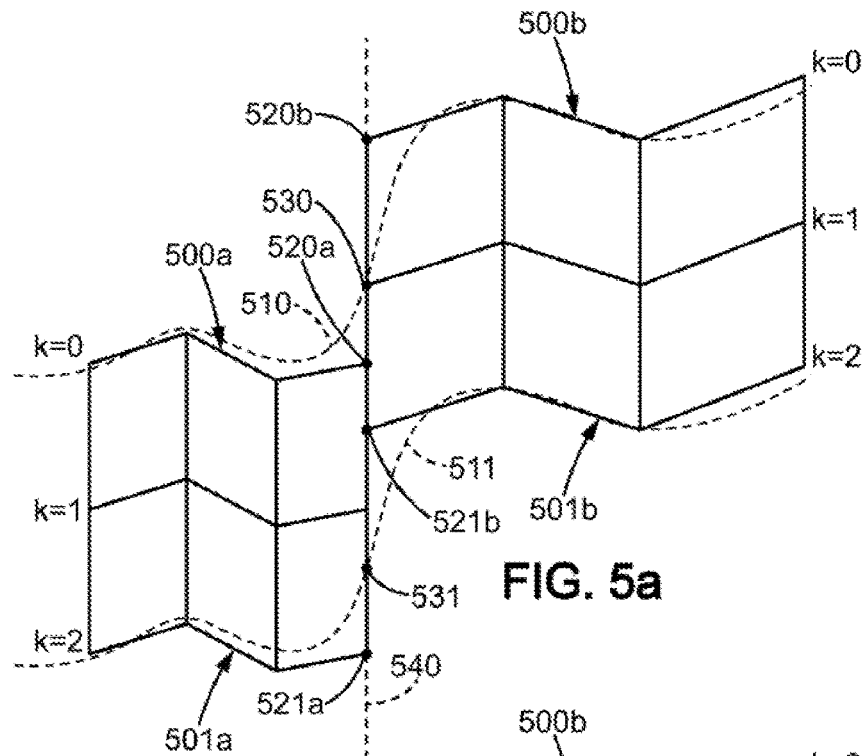
FIG. 5a shows an example mesh model for a fault prior to deformation of the mesh.

FIG. 5a illustrates an example mesh model of a fault before deformation of the mesh.

Figure 5B:
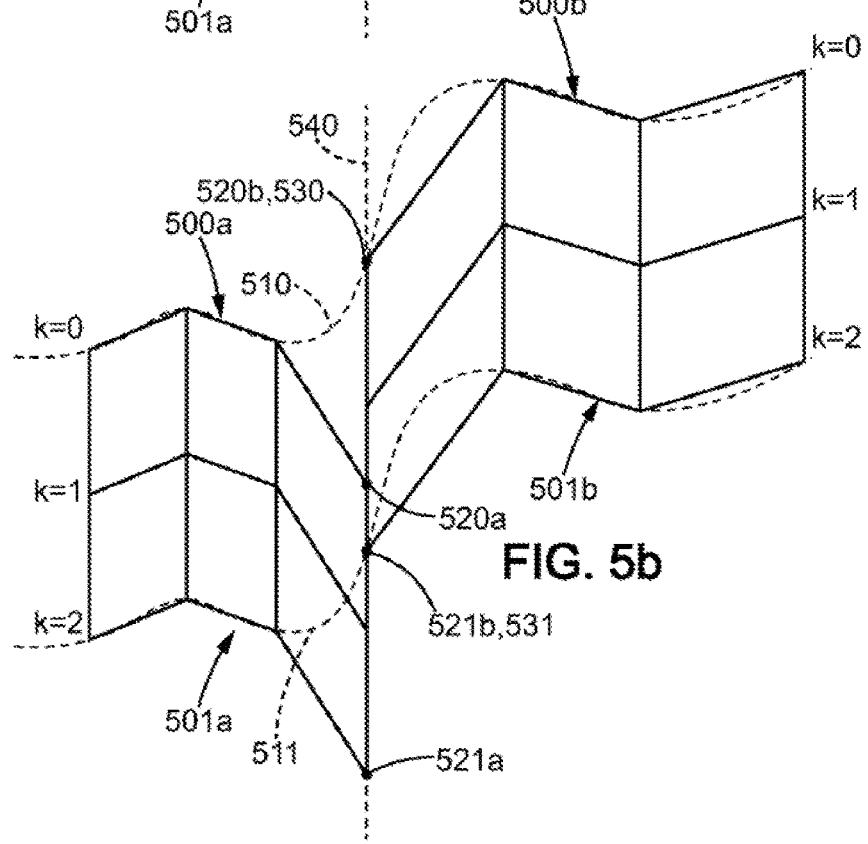
FIG. 5b shows an example mesh model of a fault after deformation of the mesh.

FIG. 5b illustrates an example mesh model of a fault after deformation of the mesh.

In this example mesh, the upper reference interface has an index k=0. Thus this upper reference interface, denoted 500a-500b, has surfaces 500a and 500b. In addition, the lower reference interface has an index k=2. Thus, this lower reference interface, denoted 501a-501b, has surfaces 501a and 501b.

Surface 510 is the upper target interface, a target interface associated with the reference interface 500a-500b. Surface 511 is the lower target interface, a target interface associated with reference interface 501a-501b.

In the event of deformation, the deformed mesh of FIG. 5b may have a singularity at a fault. The presence of this singularity may be related to the fact that the reference interfaces are discontinuous.

In effect, the presence of a discontinuity in the reference interfaces results in pillar 540 having multiple intersections with reference interface 500a-500b (in other words points 520a and 520b, respectively part of surface 500a and 500b). Similarly, pillar 540 has multiple intersections with reference interface 501a-501b (in other words, points 521a and 521b, respectively part of surface 501a and 501b). When implementing the method described above, only one intersection is used per reference interface to calculate modifications to the corners of the alignment.

In the example of FIG. 5b, corner 520b was chosen to be displaced at point 530 (in other words the intersection of pillar 540 and target interface 510). Corner 520a thus cannot correspond to point 530 and is moved substantially downward. In addition, in the example of FIG. 5b, corner 521b was chosen to be displaced at point 531 (in other words the intersection of pillar 540 and target interface 511). Corner 521a thus cannot correspond to point 531 and is moved substantially downward.

A singularity is thus created at the fault.

To take this discontinuity into account and reduce the appearance of such singularities, it is possible to apply the algorithm proposed in FIG. 4 (calculating the average or thresholding).

Other algorithms to reduce the appearance of singularities can exist.

For example, the modification of the coordinates of corners of alignments located at a predetermined distance from a fault (or "area of influence") can thus be governed by specific rules other than those described above. The predetermined distance may be any distance in the mathematical sense: it may be expressed as the number of alignments, or any other measurement suitable for the model.

It is thus possible to determine the modification of the coordinates of points in the area of influence on the basis of modifications calculated for points outside this area and on the same side of the fault (in other words on the same fault panel). The points serving as the basis for this determination can be those located on the same interface as the point in the modification to be determined.

The modification of the coordinates of a point in the area of influence may be determined by performing a weighted average of the modifications calculated for the points serving as a basis for this determination, for example by using a weight inversely proportional to the distance. Of course, it is possible to not take into account the points located outside the area of influence and located beyond a predetermined distance from the area of influence or from the fault.

In addition, it is possible to determine the modification of the coordinates of a point in the area of influence by performing a linear or polynomial extrapolation as a function of modifications determined from points near the area of influence but outside it. This extrapolation seeks to highlight a trend toward modification in an area close to the fault but not in the area of influence of the fault.

Figure 6:
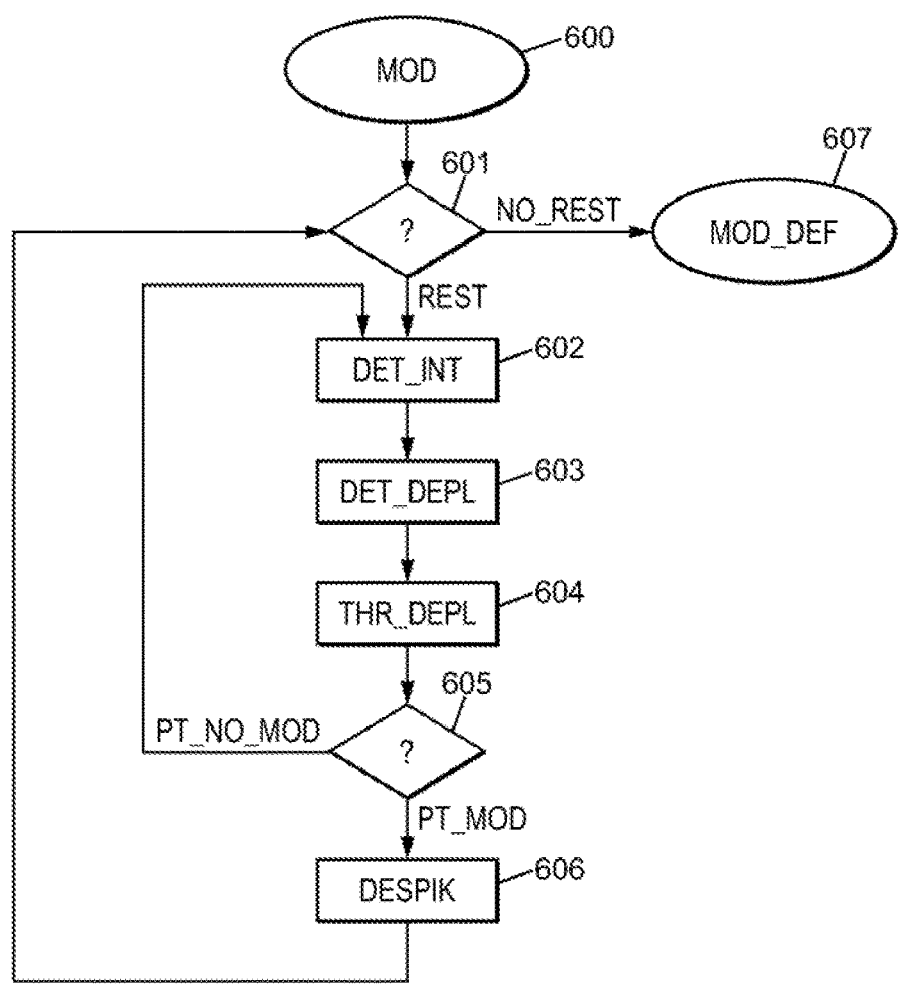
FIG. 6 shows a possible flow diagram of an embodiment of the invention.

FIG. 6 illustrates a possible flowchart of one embodiment of the invention.

Upon receipt of a mesh model comprising a plurality of reference interfaces and associated target interfaces, it is possible to determine a sequential order in these interfaces, for example according to their position along axis $\vec{z}$ of the model.

It is then possible to group these interfaces, each interface group comprising two successive reference interfaces in the sequence of the plurality of interfaces.

If a group of reference interfaces has not been processed (test 601, REST output), then this group of interfaces is selected.

For each of the pillars comprised between the two interfaces of the selected group, it is possible to determine the intersections between the pillar and the two reference interfaces (step 602). In addition, it is also possible to determine the intersections between this pillar and the target interfaces associated with these two reference interfaces (step 602). Example embodiments for determining these intersections are presented above.

On the basis of the coordinates of these intersections, it is then possible to determine translations of the points/corners of the pillar along said pillar (step 603). Example embodiments for determining these translations are presented in relation with FIG. 2.

It is possible to limit the standard translation of points of this pillar as presented above (step 604).

If the pillars comprised between the two interfaces of the selected group have not been processed (test 605, PT_NO_MOD output), it is then possible to apply the described method to these pillars.

Otherwise (test 605, PT_MOD output), a smoothing of each layer of the model and as described in relation with FIG. 4 can be performed (step 606).

If all the groups of reference interfaces have been processed (test 601, output NO_REST), then the modified model 607 can be returned to the operator and/or provided as input to a new calculation module for additional processing.

Figure 7:
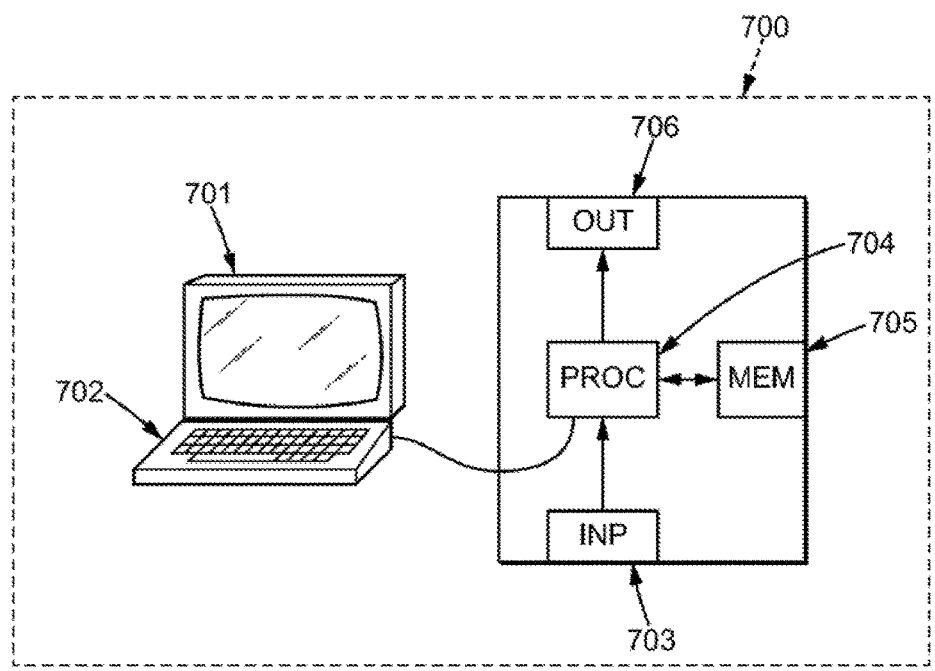
FIG. 7 shows a possible computing device for deforming a mesh, making use of an embodiment of the invention.

FIG. 7 represents an example device for deforming cells of a mesh model, in one embodiment of the invention.

In this embodiment, the device comprises a computer 700, comprising a memory 705 for storing instructions for implementing the method, the measurement data received, and temporary data for carrying out the various steps of the method as described above.

The computer further comprises circuitry 704. This circuitry may be, for example:
- a processor adapted to interpret instructions in the form of a computer program, or
- a circuit board in which the steps of the inventive method are laid out in the silicon, or
- a programmable chip such as an FPGA chip ("field-programmable gate array").

This computer comprises an input interface 703 for receiving measurement data, and an output interface 706 for providing a modified model. Finally, the computer may comprise a screen 701 and a keyboard 702, for easy interaction with a user. The keyboard is of course optional, particularly in the context of a computer in the form of a touch tablet for example.

The block diagram shown in FIG. 6 is a typical example of a program of which some instructions may be carried out by the device described above. FIG. 6 can then correspond to the flowchart of the general algorithm of a computer program within the meaning of the invention.

Of course, the invention is not limited to the embodiments described above as examples; it extends to other variants. Other embodiments are possible. For example, some embodiments described above are applied to two-dimensional models, but they can also easily be applied to three-dimensional models.

The invention claimed is:

1. A method for adapting a mesh model of a geological subsurface obtained using measurements of said geological subsurface, to match it to a target,
said mesh model comprising a plurality of reference interfaces comprising a sequence, each reference interface being associated with a target interface in said target,
wherein the method comprises:
for at least one pair of successive interfaces in the sequence of the plurality of interfaces formed by a first reference interface and a second reference interface, the model comprising a plurality of alignments of mesh cell corners between said first interface and said second interface, these alignments forming mesh cell edges, each corner having initial coordinates in the model and for each current alignment among said plurality of cell corners:
determining a first intersection between the current alignment and said first reference interface;
determining a second intersection between the current alignment and said second reference interface;
determining a third intersection between the current alignment and the target interface associated with said first reference interface;
determining a fourth intersection between the current alignment and the target interface associated with said second reference interface;
modifying the coordinates for each current corner of the alignment as a function of the initial coordinates of said current corner, of the first intersection, second intersection, third intersection, and fourth intersection, the modified coordinates of said current corner being on the current alignment
determining through an adapted mesh model an amount of a gas or a hydrocarbon reserve in a real reservoir represented by at least a part of the model;
wherein the method further comprises, for at least one pair of successive interfaces, the corners of said alignments comprised between said first interface and said second interface having a sequence number in each alignment:
for each current sequence number, identification of an intermediate interface formed of cell sides, said sides having as corners the corners of said current sequence number:
for each intermediate interface and for each current corner of said current interface,
determining a bounding box around the current corner;
a second modification of the coordinates of said current corner as a function of the current coordinates of said current corner and as a function of the current coordinates of corners that lie within the bounding box around the current corner.

2. The method according to claim 1, wherein, a current coordinate system being defined along the current alignment, the first intersection having a coordinate $c_1$ in the current coordinate system, the second intersection having a coordinate $c_2$ in the current coordinate system, the third intersection having a coordinate $c_3$ in the current coordinate system, the fourth intersection having a coordinate $c_4$ in the current coordinate system, said current corner having an initial coordinate $c_c$ in the current coordinate system,
the modified coordinate of said current corner in the current coordinate system is a function of $$C_n = C_C + (C_2 - C_4) + (C_1 - C_3 - C_2 + C_4)\frac{C_c - C_2}{C_1 - C_2}.$$

3. The method according to claim 1, wherein, the coordinates of the corners being expressed by a plurality of components, the second modification of the coordinates of said corner comprises calculating a median filter or an average of the coordinates of said current corner along at least one component and of the coordinates of said corners, that lie within a bounding box around the current corner, along the at least one component.

4. Method according to claim 1, wherein, said current corner being comprised in an alignment, the second modification of the coordinates of said current corner maintains said corner in said alignment.

5. The method according to claim 1, wherein the bounding box is a function of a distance from said current corner to a fault in said model.

6. The method according to claim 1, wherein the bounding box is a function of an anisotropic direction in said model.

7. The method according to claim 6, wherein the anisotropic direction is parallel to a line passing through said current corner and perpendicular to a fault in said model.

8. The method according to claim 1, wherein, the coordinates of the corners being expressed by a plurality of components, the distance between a current corner and a modified current corner, along at least one coordinate component, is less than a threshold value.

9. The method according to claim 1, wherein, the model comprising at least one fault, the method further comprises:
identifying at least one corner having a distance to the at least one fault that is less than a predetermined influence distance;
modifying the coordinates of the corner having a distance to the at least one fault that is less than the predetermined influence distance, as a function of modifications determined for a plurality of points having a distance to the at least one fault that is greater than the predetermined influence distance and part of a common interface with the corner having a distance to the at least one fault that is less than the predetermined influence distance.

10. The method according to claim 9, wherein the modification of the coordinates of the corner having a distance to the at least one fault that is less than the predetermined influence distance comprises a calculation of a weighted average.

11. The method according to claim 9, wherein the modification of the coordinates of the corner having a distance to the at least one fault that is less than the predetermined influence distance includes a regression.

12. A device for adapting a mesh model obtained using measurements of a geologic subsurface, to match it to a target, said model comprising a plurality of reference interfaces, the plurality of reference interfaces comprising a sequence and each reference interface being associated with a target interface in said target,
wherein the device comprises:
an input interface for receiving the mesh model;
circuitry suitable for carrying out the following actions
for at least one pair of successive interfaces in the sequence of the plurality of interfaces, formed by a first reference interface and a second reference interface, the model comprising between said first interface and said second interface a plurality of mesh corner alignments, these alignments forming mesh cell edges, each corner having initial coordinates in the model and for each current alignment among said plurality of mesh corners:
determining a first intersection between the current alignment and said first reference interface;
determining a second intersection between the current alignment and said second reference interface;
determining a third intersection between the current alignment and the target interface associated with said first reference interface;
determining a fourth intersection between the current alignment and the target interface associated with said second reference interface;
modifying the coordinates for each current corner of the alignment as a function of the initial coordinates of said current corner, of the first intersection, second intersection, third intersection, and fourth intersection, the modified coordinates of said current corner being on the current alignment;
an output interface for providing the modified mesh model and
determining a gas or a hydrocarbon reserve in a real reservoir represented by at least a part of the model;
wherein the circuitry is further suitable for carrying out, for at least one pair of successive interfaces, the corners of said alignments comprised between said first interface and said second interface having a sequence number in each alignment:
for each current sequence number, identification of an intermediate interface formed of cell sides, said sides having as corners the corners of said current sequence number;
for each intermediate interface and for each current corner of said current interface,
determining a bounding box around the current corner;
a second modification of the coordinates of said current corner as a function of the current coordinates of said current corner and as a function of the current coordinates of corners that lie within the bounding box around the current corner.

13. A non-transitory computer readable storage medium for adapting a mesh model of a geological subsurface obtained using measurements of said geological subsurface, to match it to a target, said model comprising a plurality of reference interfaces comprising a sequence, each reference interface being associated with a target interface in said target,
the non-transitory computer readable storage medium having stored thereon a computer program comprising program instructions, the computer program being loadable into a data-processing unit and adapted to cause, when the computer program is run by the data-processing unit, the data-processing unit to carry out :
for at least one pair of successive interfaces in the sequence of the plurality of interfaces formed by a first reference interface and a second reference interface, the model comprising a plurality of alignments of mesh cell corners between said first interface and said second interface, these alignments forming mesh cell edges, each corner having initial coordinates in the model and for each current alignment among said plurality of cell corners:
determining a first intersection between the current alignment and said first reference interface;
determining a second intersection between the current alignment and said second reference interface;
determining a third intersection between the current alignment and the target interface associated with said first reference interface;
determining a fourth intersection between the current alignment and the target interface associated with said second reference interface;
modifying the coordinates for each current corner of the alignment as a function of the initial coordinates of said current corner, of the first intersection, second intersection, third intersection, and fourth intersection, the modified coordinates of said current corner being on the current alignment;

determining of a gas or a hydrocarbon reserve in a real reservoir represented by at least a part of the model;

wherein the computer program being is further adapted to carry out, for at least one pair of successive interfaces, the corners of said alignments comprised between said first interface and said second interface having a sequence number in each alignment:

for each current sequence number, identification of an intermediate interface formed of cell sides, said sides having as corners the corners of said current sequence number;

for each intermediate interface and for each current corner of said current interface, determining a bounding box around the current corner;

a second modification of the coordinates of said current corner as a function of the current coordinates of said current corner and as a function of the current coordinates of corners that lie within the bounding box around the current corner.

* * * * *